(12) United States Patent
Takamine et al.

(10) Patent No.: US 10,585,340 B2
(45) Date of Patent: Mar. 10, 2020

(54) PROJECTOR

(71) Applicant: SEIKO EPSON CORPORATION, Tokyo (JP)

(72) Inventors: Yusaku Takamine, Azumino (JP); Takahiro Totsuka, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/386,780

(22) Filed: Apr. 17, 2019

(65) Prior Publication Data

US 2019/0324355 A1   Oct. 24, 2019

(30) Foreign Application Priority Data

Apr. 18, 2018   (JP) .................................. 2018-079633

(51) Int. Cl.
*G03B 21/14* (2006.01)
*H04N 9/31* (2006.01)

(52) U.S. Cl.
CPC ......... *G03B 21/145* (2013.01); *G03B 21/147* (2013.01); *H04N 9/3185* (2013.01)

(58) Field of Classification Search
CPC .... G03B 21/14; G03B 21/142; G03B 21/147; H04N 9/31; H04N 9/3185
USPC ............................................. 353/69, 70, 119
See application file for complete search history.

(56) References Cited

U.S. PATENT DOCUMENTS

| | | | |
|---|---|---|---|
| 7,198,238 B2* | 4/2007 | Inoue ................... | A47B 91/024 248/188.4 |
| 2005/0263663 A1* | 12/2005 | Inoue ....................... | F16M 7/00 248/354.1 |
| 2011/0058317 A1* | 3/2011 | Oota ........................ | F16M 7/00 361/679.01 |

FOREIGN PATENT DOCUMENTS

JP        2011-242525 A        12/2011

* cited by examiner

*Primary Examiner* — William C. Dowling
(74) *Attorney, Agent, or Firm* — Oliff PLC (57) ABSTRACT

A projector includes a leg portion adjusting an installation angle of an external housing. The leg portion includes a columnar member moving in a first direction, a case member in which the columnar member is accommodated, a fixing member including an engaging portion along the first direction inside the case member and fixing the columnar member, and a switching member moving in a second direction crossing the first direction and switching the fixing member between a state in which the fixing member moves in a direction toward the columnar member to engage therewith and a state in which the fixing member moves in a direction away from the columnar member to release the engagement therewith. The columnar member includes an engaged portion to be engaged with the engaging portion of the fixing member inside the case member, and a base portion moving in the first direction outside the case member.

8 Claims, 10 Drawing Sheets

PROJECTOR

The present application is based on, and claims priority from JP Application Serial Number 2018-079633, filed Apr. 18, 2018, the disclosure of which is hereby incorporated by reference herein in its entirety.

BACKGROUND

1. Technical Field

The present disclosure relates to a projector.

2. Related Art

In the related art, when a projector is placed on a desk top surface to project an image onto a screen or the like, an installation angle of the projector needs to be adjusted such that the image projected onto the screen is within the region of the screen. In doing so, the installation angle is adjusted using a leg portion for angle adjustment installed on a bottom surface portion or the like of an external housing of the projector by adjusting a projection length from the bottom surface portion.

A leg portion for angle adjustment disclosed in JP-A-2011-242525 includes a leg portion main body pivoting with respect to an external housing to change a projection length from an outer surface of the external housing, and a projecting portion extending from the leg portion main body toward the inside of the external housing along a pivot direction of the leg portion main body.

JP-A-2011-242525 is an example of the related art.

A related-art leg portion main body including the leg portion disclosed in JP-A-2011-242525 is provided with a projecting and depressed portion for locking the leg portion main body after an angle adjustment. The leg portion main body after the angle adjustment is projected and exposed from the bottom surface portion of the external housing, and the projecting and depressed portion is also in the exposed state. For this reason, the leg portion main body after the angle adjustment has a complicated external appearance due to the exposed projecting and depressed portion, and thus, there is a problem in that an aesthetic appearance is impaired. Moreover, dust tends to adhere to the exposed projecting and depressed portion, and thus, there is a problem in that the adhering dust tends to enter the inside of the housing due to the repetition of the angle adjustment. For solving these problems, a novel structure of the leg portion configured to perform the adjustment of the installation angle is a subject.

SUMMARY

A projector according to an aspect of the present application includes a leg portion that is installed on a bottom surface of a housing and that adjusts an installation angle of the housing, wherein the leg portion includes a columnar member movably installed in a first direction crossing the bottom surface, a case member in which the columnar member is accommodated, a fixing member that includes an engaging portion along the first direction inside the case member and that fixes the columnar member, and a switching member that is movably installed in a second direction crossing the first direction and that switches the fixing member between a state in which the fixing member moves in a direction toward the columnar member, in the second direction inside the case member, to thereby engage with the columnar member and a state in which the fixing member moves in a direction away from the columnar member to thereby release engagement with the columnar member.

The columnar member of the projector may include an engaged portion to be engaged with the engaging portion of the fixing member inside the case member, and a base portion moving in the first direction outside the case member.

The case member of the projector may include a guide portion guiding movement of the switching member in the second direction.

The switching member of the projector may include a holding portion holding the fixing member.

The projector may include a spring member moving the switching member in a direction in which the fixing member engages with the columnar member.

The switching member of the projector may include a tip portion extending from the bottom surface, engagement of the fixing member with the columnar member may be released by pressing and moving the tip portion in the second direction, and engagement of the fixing member with the columnar member may be performed by stopping the pressing.

A shape of the engaging portion and the engaged portion of the projector may be a screw shape or a rack shape.

The case member of the projector may accommodate the engaged portion of the columnar member, the fixing member, the switching member other than the tip portion, and the spring member so as to hermetically seal the engaged portion of the columnar member, the fixing member, the switching member other than the tip portion, and the spring member in the inside of the case member, and the base portion of the columnar member may be movable to the outside of the case member.

DESCRIPTION OF EXEMPLARY EMBODIMENTS

Hereinafter, an embodiment of the present disclosure will be described with reference to the drawings. In the drawings below, the scales of members are different from actual ones in order to show the members in sizes recognizable on the drawings.

Figure 1:
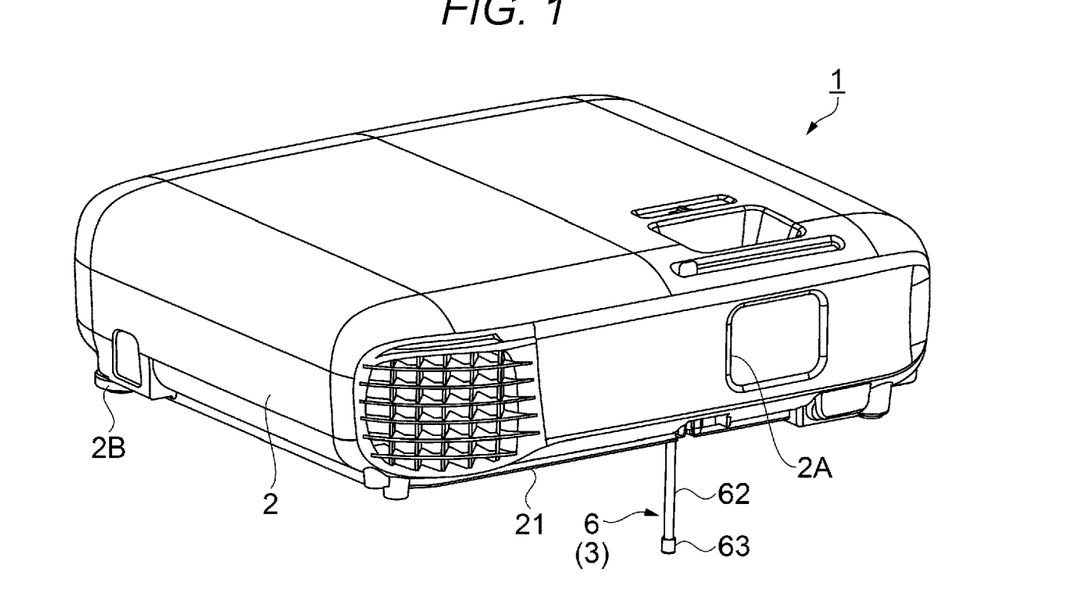
FIG. 1 is a perspective view showing an external housing and a leg portion of a projector according to an embodiment.
Figure 2:
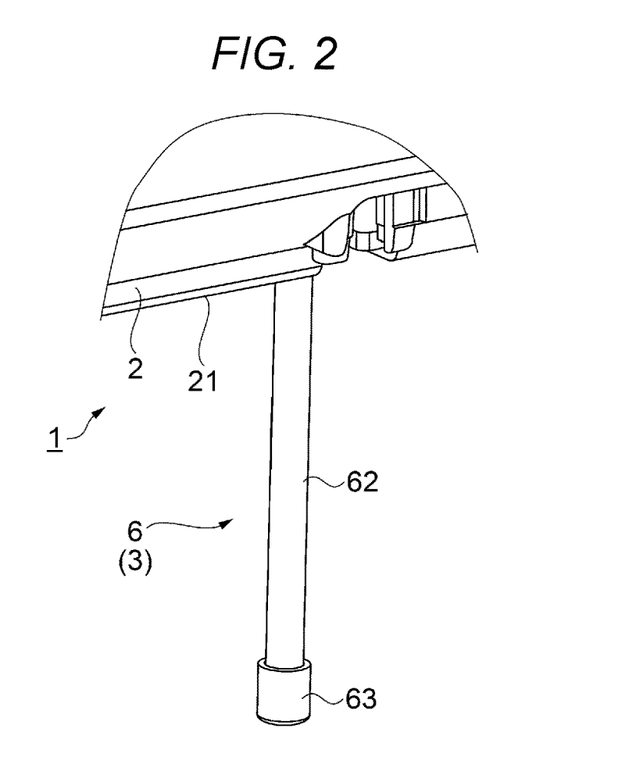
FIG. 2 is an enlarged view of the leg portion.

FIG. 1 is a perspective view showing an external housing 2 and a leg portion 3 of a projector 1. FIG. 2 is an enlarged view of the leg portion 3. FIGS. 1 and 2 are perspective views when the projector 1 is viewed from the front-surface upper side.

In the following, the projection side (a side on which an opening 2A for a projection lens (not shown) of the external housing 2 is formed) in the projector 1 is defined as a front surface, and the side opposite to the front surface is defined as a back surface (or a rear surface). Moreover, "up and down", "left and right", and "front and rear" described hereinafter mean "up and down" and "front and rear" in a state in which the projector 1 is installed in a posture shown in FIG. 1 and mean "left and right" as viewed from the front surface side. The leg portion 3 is installed in the projector 1, and "up and down", "left and right", and "front and rear" are also used for the leg portion 3 in the same manner as for the projector 1.

The projector 1 is a device that projects an image to display a projection image onto a screen (not shown). As shown in FIGS. 1 and 2, the projector 1 includes the external housing 2 constituting an exterior, and the leg portion 3 for adjusting an installation angle (adjusting a projection position) of the projector 1 placed on a placement surface (e.g., a desk top surface).

Configuration of External Housing

As shown in FIG. 1, the external housing 2 is formed in a substantially rectangular parallelepiped shape. An optical component portion, a circuit component portion, and the like are accommodated in the inside of the external housing 2. The optical component portion is configured to include a light source device, a light modulator such as a liquid crystal panel that modulates, based on image information, light emitted from the light source device, and a projection lens that projects the light modulated by the light modulator. The circuit component portion is configured to include a circuit for controlling the projector 1 including the optical component portion.

The optical component portion, the circuit component portion, and the like are used in various general projectors, and therefore, a specific drawing or description is omitted.

In the external housing 2, fixed legs 2B are respectively installed at two corner portions of a bottom surface portion 21 on the back surface side. The fixed leg 2B is provided so as to project from an outer surface of the bottom surface portion 21. The fixed leg 2B is a portion that comes in contact with the placement surface (e.g., a desk top surface) when the projector 1 is placed on the placement surface. An opening (not shown) that communicates between the interior and exterior of the external housing 2 is formed in the bottom surface portion 21 at the substantially central portion thereof in the left-right direction on the front surface side. The leg portion 3 is fit into the opening.

Configuration of Leg Portion

Figure 3A:
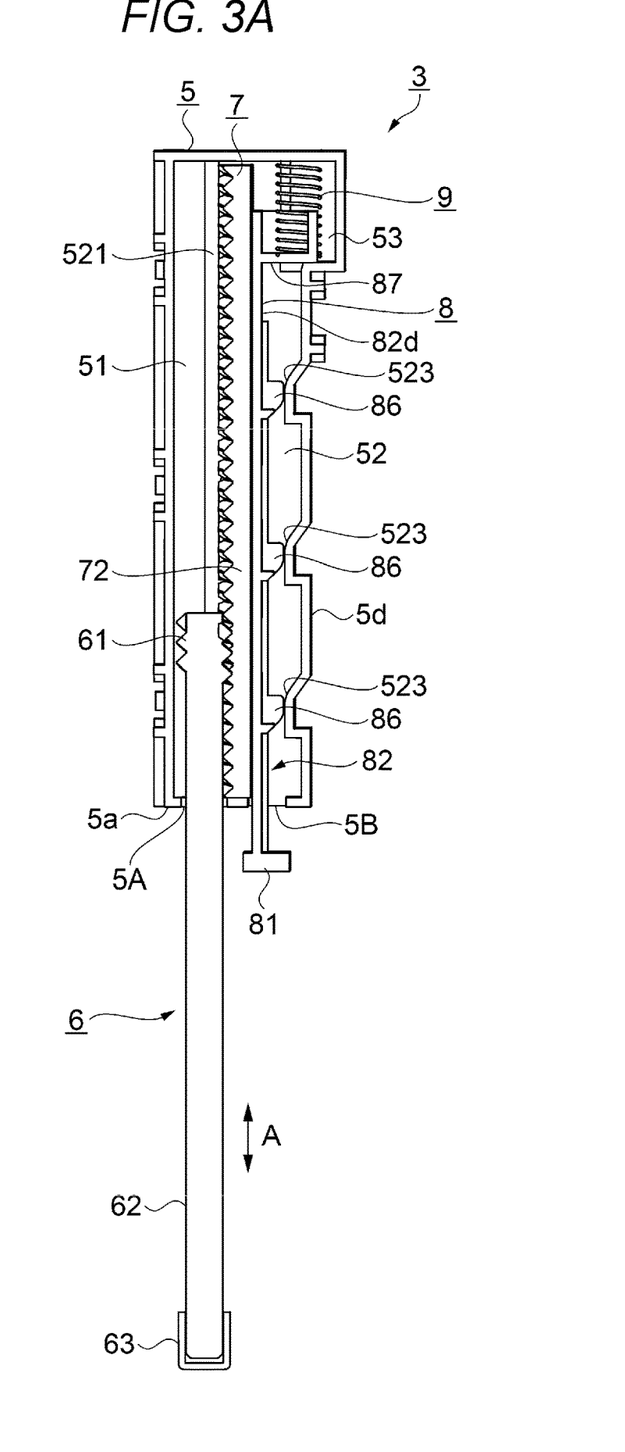
FIG. 3A is a cross-sectional view of the leg portion in a state in which the leg portion is cut in a front-rear direction.
Figure 3B:
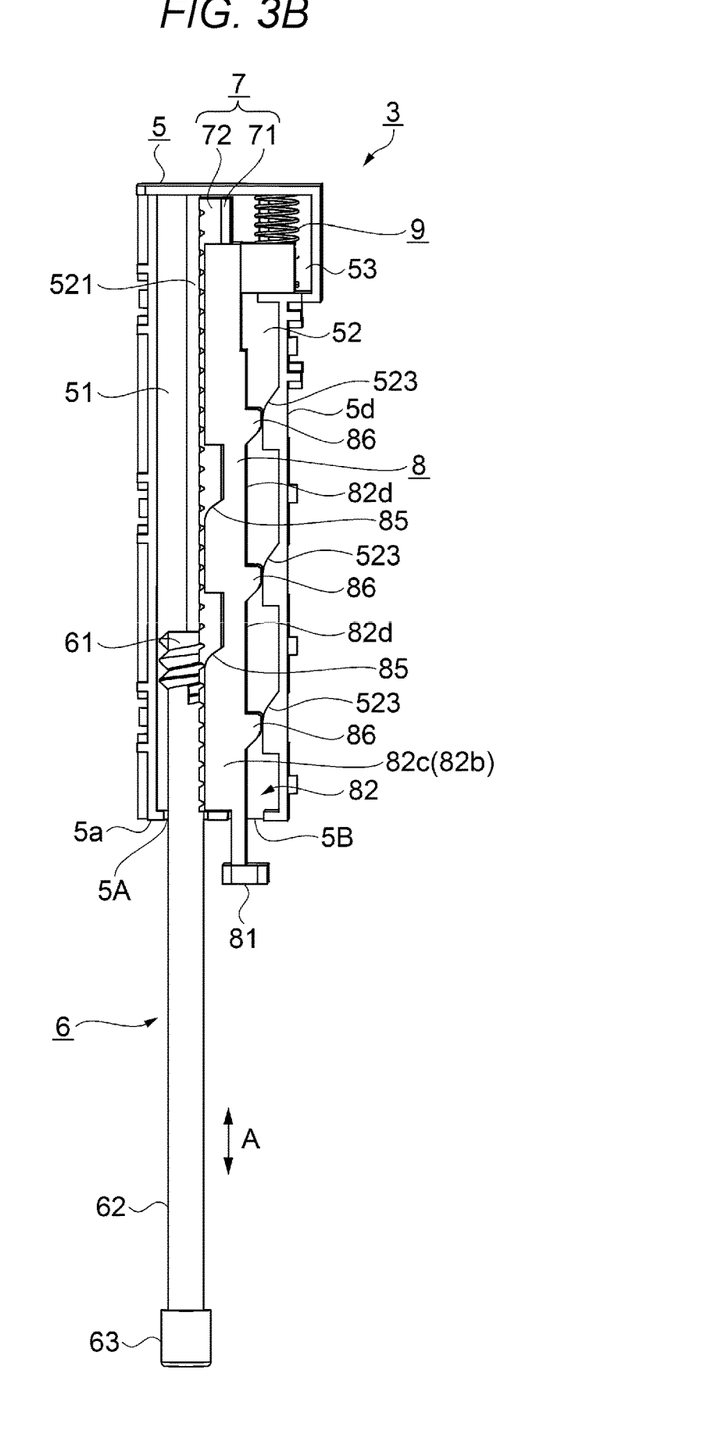
FIG. 3B is a cross-sectional view of the leg portion in a state in which the leg portion is cut in the front-rear direction.

FIGS. 3A and 3B are cross-sectional views of the leg portion 3 in a state in which the leg portion 3 is cut in the front-rear direction. Moreover, FIGS. 3A and 3B show a state in which a fixing member 7 fixes a columnar member 6. Specifically, FIG. 3A shows a state in which the leg portion 3 is cut in the front-rear direction and cut at the center in the left-right direction. Specifically, FIG. 3B shows a state in which the leg portion 3 is cut in the front-rear direction and cut on the left side of the center in the left-right direction. Therefore, in FIG. 3B, a switching member 8 is shown in a side view as viewed from the left side.

Figure 4A:
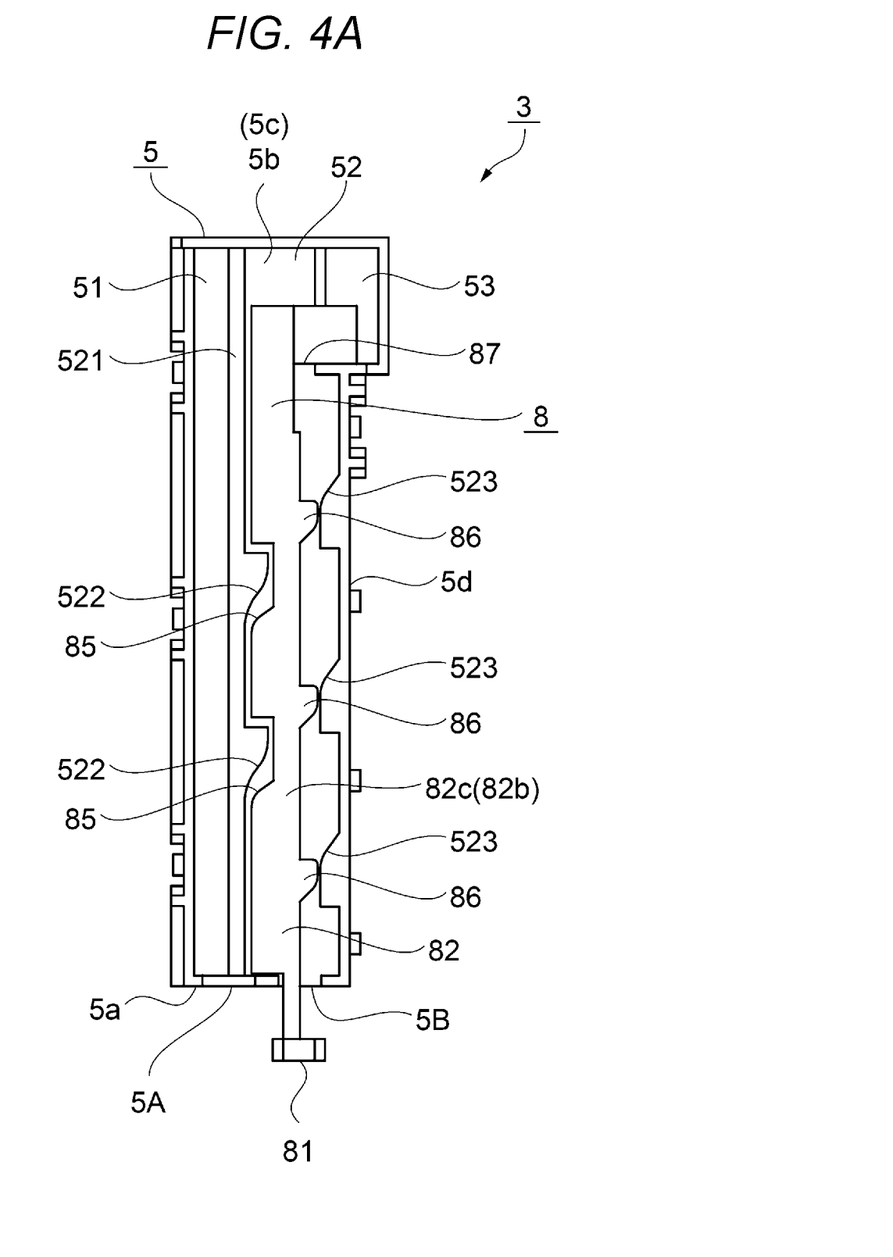
FIG. 4A is a cross-sectional view for explaining the operation of a switching member at the time of an angle adjustment.
Figure 4B:
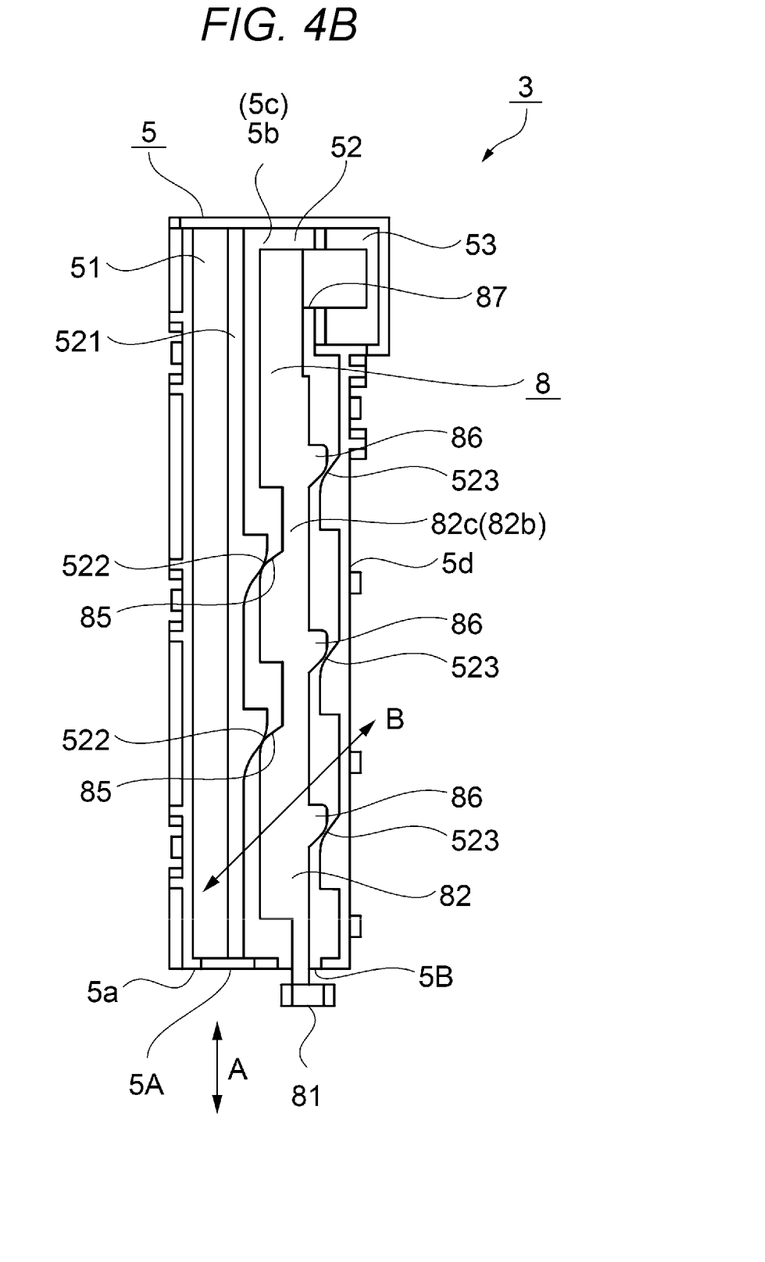
FIG. 4B is a cross-sectional view for explaining the operation of the switching member at the time of the angle adjustment.
Figure 4C:
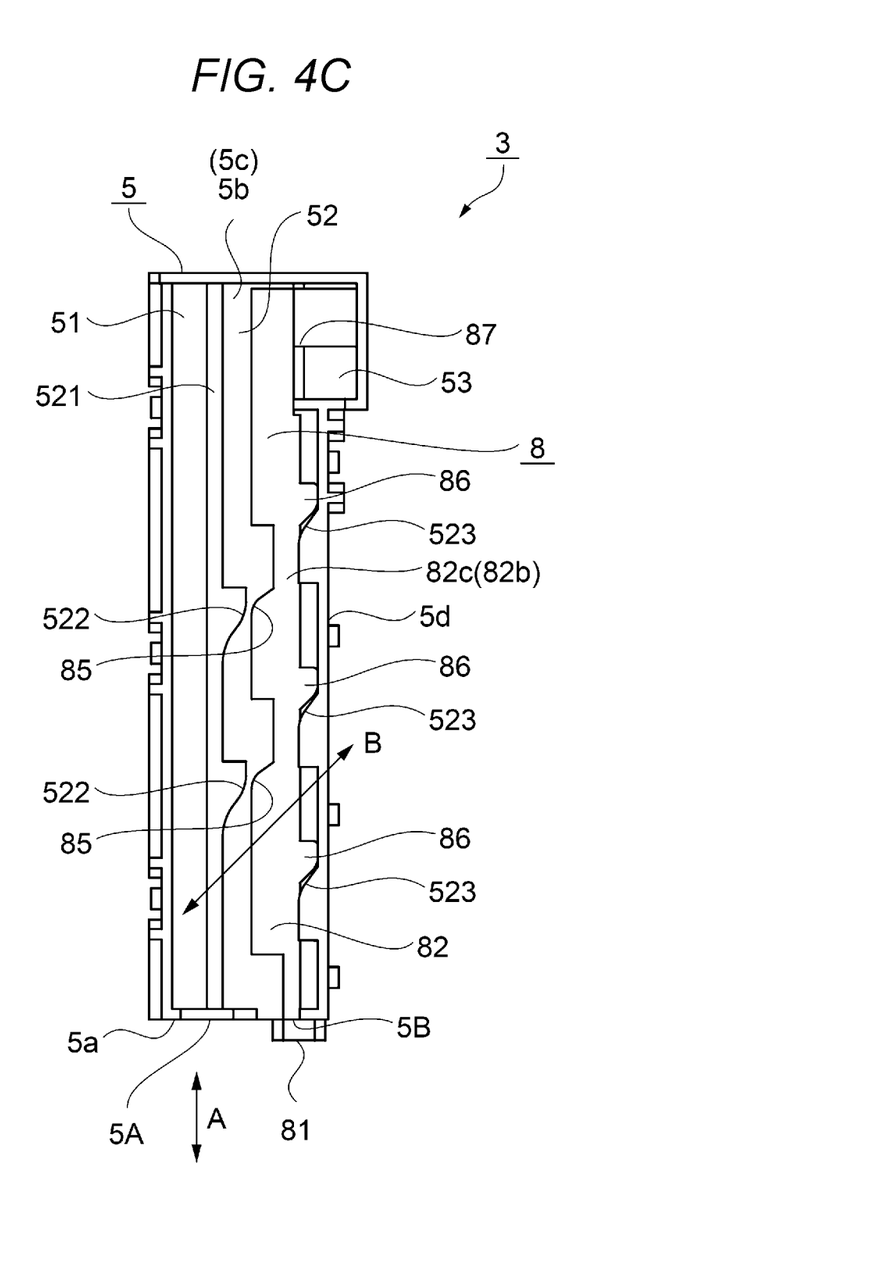
FIG. 4C is a cross-sectional view for explaining the operation of the switching member at the time of the angle adjustment.

FIGS. 4A to 4C are cross-sectional views for explaining the operation of the switching member 8 at the time of an angle adjustment. In FIGS. 4A to 4C, the columnar member 6 and the fixing member 7 are not shown for convenience of description. Specifically, FIG. 4A is a cross-sectional view showing the state of the switching member 8 in a state in which the columnar member 6 is fixed. Specifically, FIG. 4B is a cross-sectional view showing a state in which the switching member 8 is moved in the up direction. Specifically, FIG. 4C is a cross-sectional view showing a state in which the switching member 8 is moved maximally in the up direction.

In FIGS. 3A, 3B, and 4A to 4C, the right side in the drawing is front, the left side in the drawing is rear, the upper side in the drawing is up, and the lower side in the drawing is down. Moreover, FIGS. 3A, 3B, and 4A to 4C are cross sections as viewed from the left side of the leg portion 3 (the projector 1).

Figure 5:
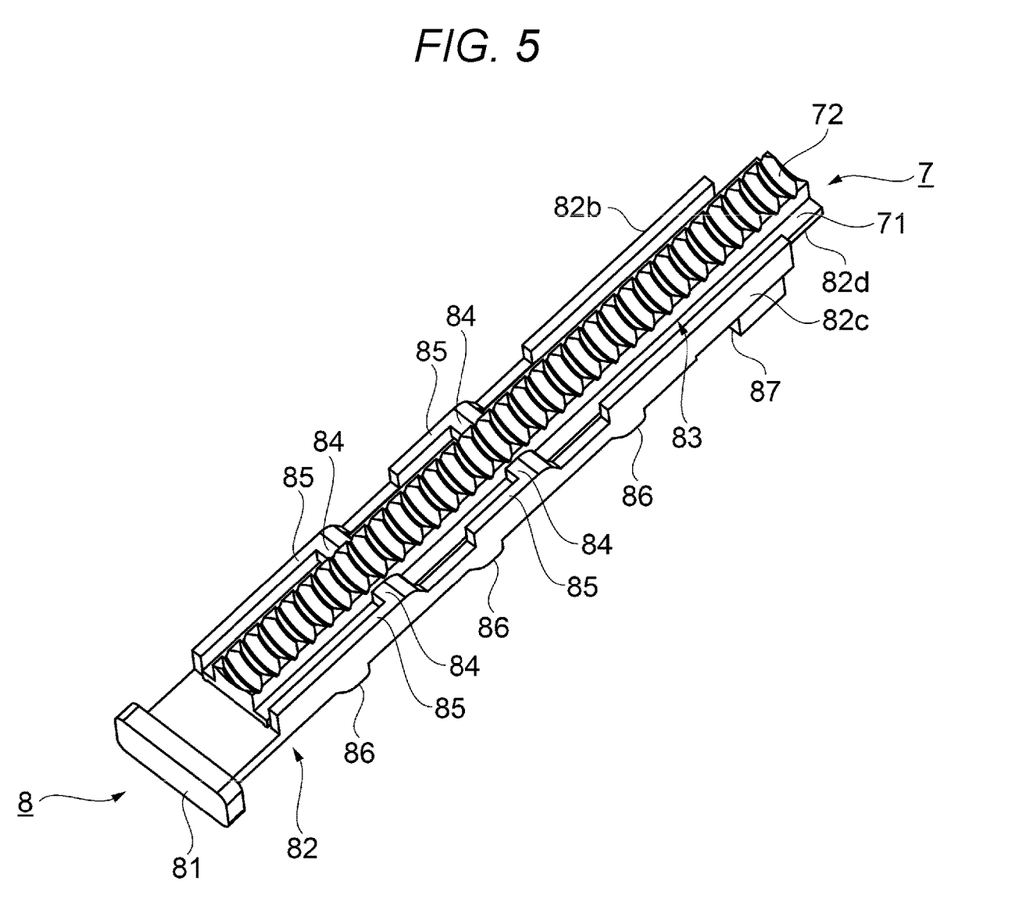
FIG. 5 is a perspective view showing the switching member and a fixing member.

FIG. 5 is a perspective view showing the fixing member 7 and the switching member 8. Specifically, FIG. 5 is a perspective view when the switching member 8 holding the fixing member 7 is viewed from the down direction on the rear side.

Figure 6A:
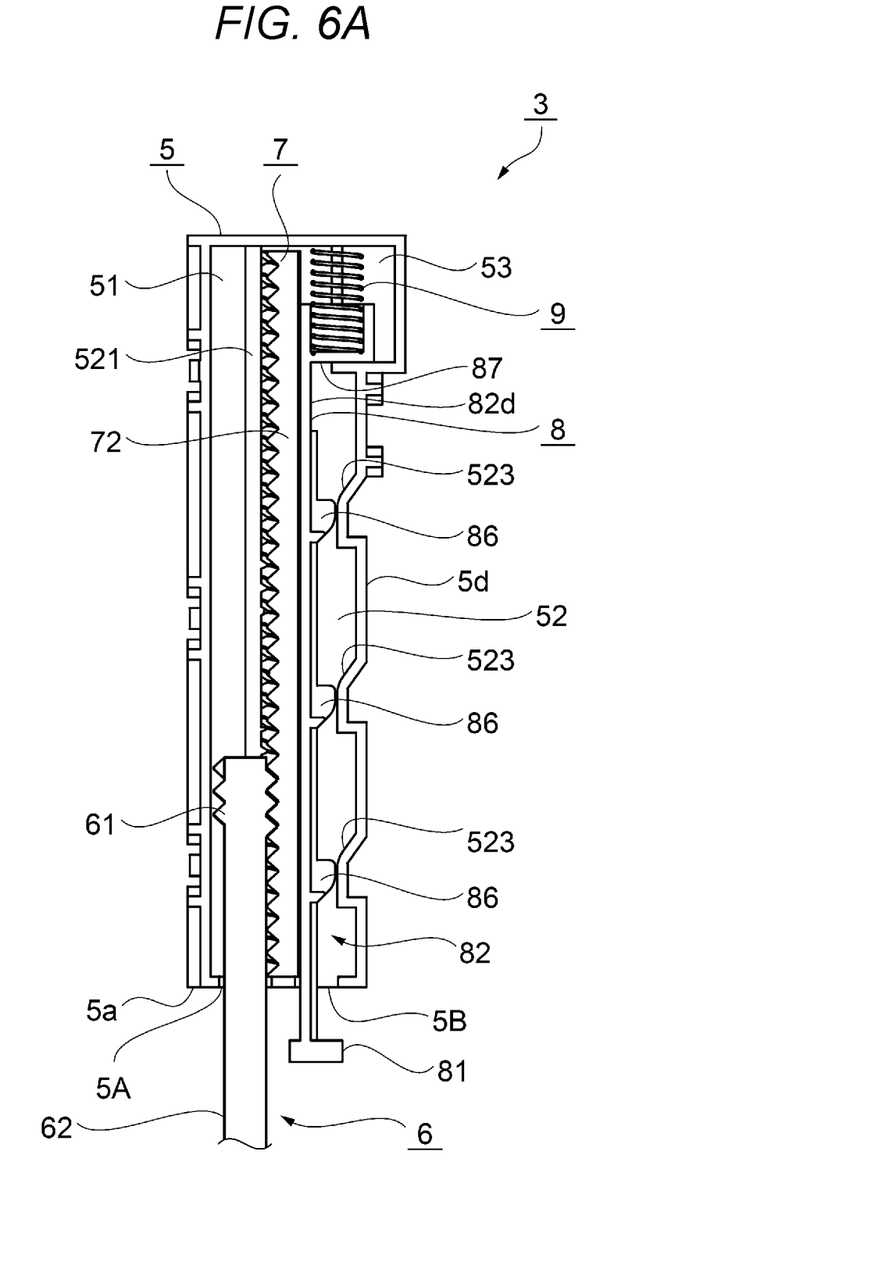
FIG. 6A is a cross-sectional view for explaining the operation of the leg portion at the time of an angle adjustment.
Figure 6B:
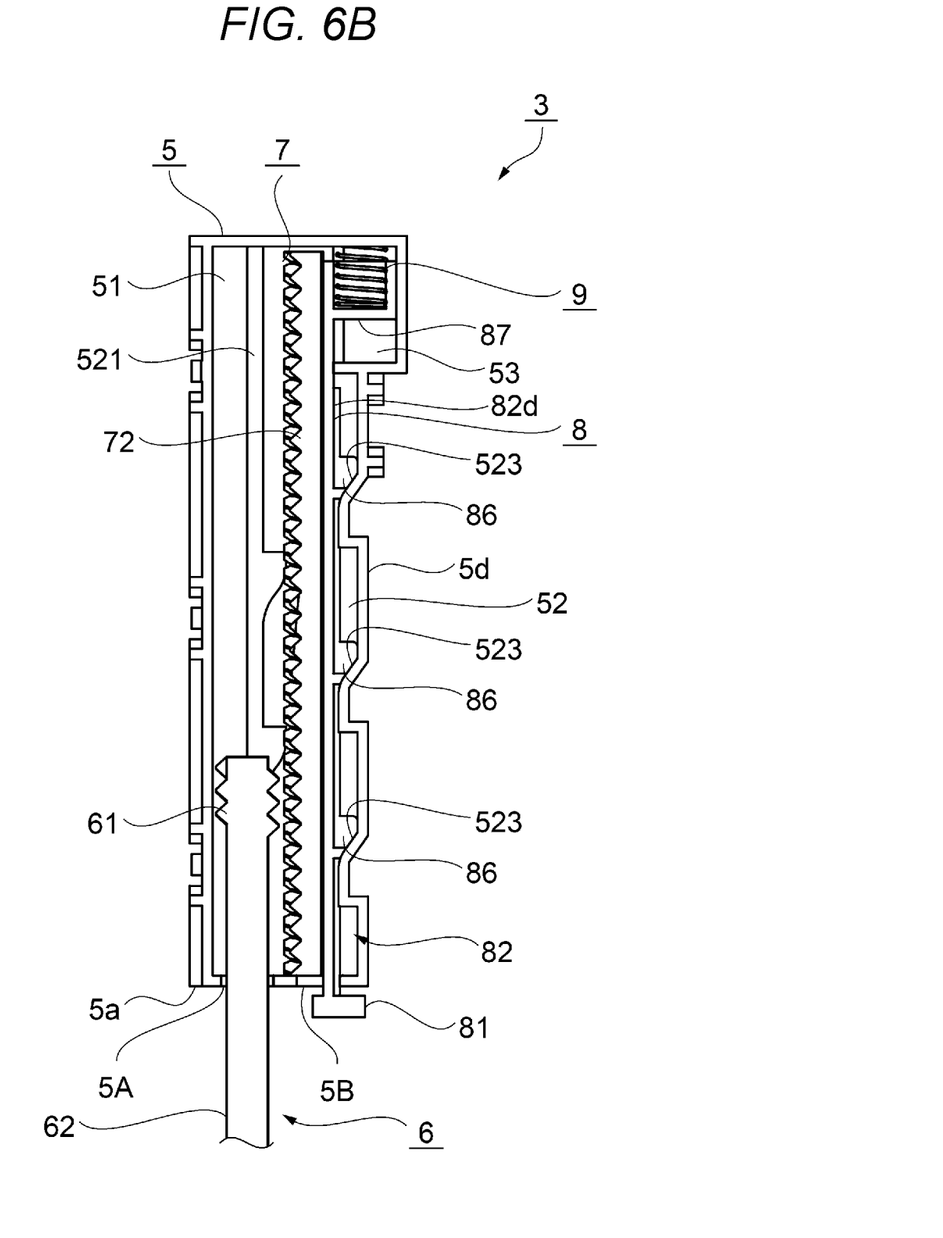
FIG. 6B is a cross-sectional view for explaining the operation of the leg portion at the time of the angle adjustment.
Figure 6C:
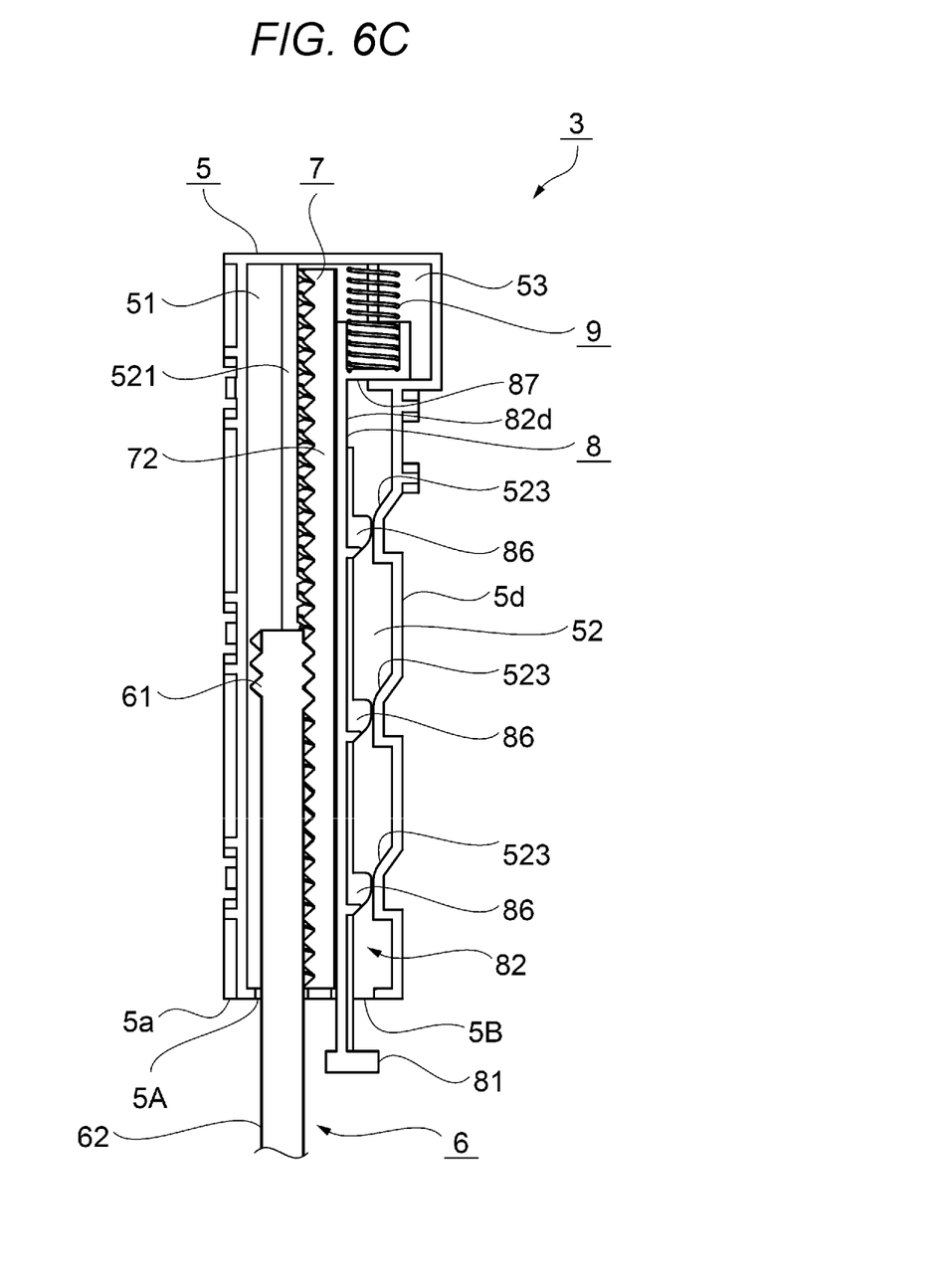
FIG. 6C is a cross-sectional view for explaining the operation of the leg portion at the time of the angle adjustment.

FIGS. 6A to 6C are cross-sectional views for explaining the operation of the leg portion 3 at the time of an angle adjustment. Specifically, FIG. 6A is a cross-sectional view showing a state in which the columnar member 6 is fixed to the fixing member 7. Specifically, FIG. 6B is a cross-sectional view showing a state in which the fixing of the columnar member 6 by the fixing member 7 is released and the angle adjustment can be made. Specifically, FIG. 6C is a cross-sectional view showing a state in which the fixing of the columnar member 6 by the fixing member 7 is again performed after the angle adjustment.

In FIGS. 6A to 6C, the right side in the drawing is front, the left side in the drawing is rear, the upper side in the drawing is up, and the lower side in the drawing is down. Moreover, FIGS. 6A to 6C are cross sections as viewed from the left side of the leg portion 3 (the projector 1).

As shown in FIGS. 3A and 3B, the leg portion 3 is configured to include a case member 5, the columnar member 6, the fixing member 7, the switching member 8, and a spring member 9.

The case member 5 is formed in a box shape to accommodate the columnar member 6, the fixing member 7, the switching member 8, and the spring member 9 in the inside of the case member 5. A columnar member accommodating portion 51, a switching member accommodating portion 52, and a spring member accommodating portion 53 are formed side by side in the inside of the case member 5. The columnar member 6 is accommodated in the columnar member accommodating portion 51, the switching member 8 is accommodated in the switching member accommodating portion 52, and the spring member 9 is accommodated in the spring member accommodating portion 53.

An opening 5A is formed in a lower side surface 5a of the case member 5 that faces the columnar member accommodating portion 51. Moreover, an opening 5B is formed in the lower side surface 5a that faces the switching member accommodating portion 52. The leg portion 3 moves a later-described base portion 62 of the columnar member 6 in a first direction A (the up-down direction) via the opening 5A.

As shown in FIGS. 3A and 3B, the first direction A coincides with the up-down direction crossing the bottom surface portion 21 of the external housing 2 or the lower side surface 5a of the case member 5 in the embodiment. The base portion 62 is projected via the opening 5A and also accommodated in the opposite direction. Moreover, a later-described pressing portion 81 of the switching member 8 is moved via the opening 5B.

With the configuration described above, the case member 5 accommodates a later-described engaged portion 61 of the columnar member 6, the fixing member 7, a portion (a switching portion main body 82) of the switching member 8 other than the pressing portion 81, and the spring member 9 so as to hermetically seal the engaged portion 61 of the columnar member 6, the fixing member 7, the portion (the switching portion main body 82) of the switching member 8 other than the pressing portion 81, and the spring member 9 in the inside of the case member 5.

The columnar member 6 is configured in a substantially cylindrical shape and moves in the first direction A to perform an angle adjustment. The columnar member 6 includes the engaged portion 61, the base portion 62, and a cap portion 63. The engaged portion 61 is located at one tip portion of the columnar member 6, is formed in a screw shape, and is a portion to be engaged with a later-described engaging portion 72 of the fixing member 7 in the inside (the columnar member accommodating portion 51) of the case member 5.

The base portion 62 is a portion that is exposed to the outside of the case member 5. In the embodiment, the base portion 62 has a cylindrical shape, and a configuration for engagement having a screw shape or the like is not formed at this portion. As shown in FIGS. 1 to 3B, the cap portion 63 is installed at the other tip portion of the columnar member 6 in a state in which the cap portion 63 covers the tip of the base portion 62 using a rubber member. The cap portion 63 serves as a portion that comes in contact with the placement surface when the projector 1 is placed on the placement surface (e.g., a desk top surface).

The spring member 9 is configured as a compression coil spring. In general, the spring member 9 is accommodated in the spring member accommodating portion 53 and biases (presses) an end portion 87 of the switching member 8 in the down direction.

As shown in FIGS. 3A to 5, the switching member 8 includes the pressing portion 81 and the switching portion main body 82. The pressing portion 81 is a portion corresponding to a tip portion of the switching member 8 extending from the bottom surface (the bottom surface portion 21) of the projector 1 and is a portion to be pressed by a user when an angle adjustment is performed. Moreover, the pressing portion 81 is a portion that is exposed from the case member 5 to the outside via the opening 5B.

As shown in FIGS. 3B and 5, the switching portion main body 82 is formed in a box shape whose one side surface (a side surface on the rear side) in the longitudinal direction is opened. The switching portion main body 82 includes a fixing member accommodating portion 83 accommodating the fixing member 7 so as to surround the fixing member 7 with a side surface (referred to as "front side surface 82d") on the front side, a right side surface, and a left side surface (referred to as "right side surface 82b" and "left side surface 82c"). Moreover, the switching portion main body 82 includes holding projections 84 as holding portions that hold (hold the fixing member 7) shoulders of a later-described substrate portion 71 of the fixing member 7 in a state in which the holding projections 84 project from the inner surface to the inside at tip portions of the right side surface 82b and the left side surface 82c of the fixing member accommodating portion 83.

As shown in FIG. 5, portions of the right side surface 82b and the left side surface 82c that project to the rear side and that include the holding projections 84 are referred to as "first sliding portion 85". The first sliding portion 85 is an edge surface configured of an R surface, including the holding projection 84, to be smoothly connected. Two first sliding portions 85 are formed along the longitudinal direction at each of the right side surface 82b and the left side surface 82c. The first sliding portion 85 determines a moving direction when the switching member 8 moves.

Second sliding portions 86 projecting to the front side are formed at front-side edge portions of the right side surface 82b and the left side surface 82c of the fixing member accommodating portion 83. The second sliding portion 86 is an edge surface configured of an R surface to be smoothly connected. Three second sliding portions 86 are formed along the longitudinal direction of each of the right side surface 82b and the left side surface 82c. The second sliding portion 86 determines the moving direction when the switching member 8 moves.

The switching portion main body 82 is accommodated in the switching member accommodating portion 52 of the case member 5. In this case, the end portion 87 of the switching portion main body 82 on the upper side is accommodated on the lower side of the spring member accommodating portion 53.

As shown in FIGS. 3B and 5, the fixing member 7 includes the substrate portion 71 extending in a plate shape, and the engaging portion 72 formed at a portion located on the inner side by a predetermined amount from both edge portions of the substrate portion 71 in the transverse direction thereof. The substrate portion 71 is accommodated in the fixing member accommodating portion 83 of the switching member 8, and both shoulders of the substrate portion 71 are held by the holding projections 84.

In a state in which the fixing member 7 is held by the switching member 8 (a state shown in FIG. 5), the fixing member 7 is restricted in movement in the front-rear direction but is not restricted in movement in the up direction. The engaging portion 72 is in a state of being exposed to the rear side. The engaging portion 72 is configured in a plate shape, and in the embodiment, the engaging portion 72 is formed in a screw shape so as to engage with the engaged portion 61 of the columnar member 6 across the substantially entire surface along the longitudinal direction. As for an area in which the screw shape of the engaging portion 72 is formed, although the screw shape is formed across the substantially entire surface along the longitudinal direction in the embodiment, the area maybe an area that can cover a moving area of the engaged portion 61 (the columnar member 6) in the columnar member accommodating portion 51.

When the switching member 8 is accommodated in the switching member accommodating portion 52 in a state in which the fixing member 7 is held, the engaging portion 72 has a length similar to the length of the switching member accommodating portion 52 in the longitudinal direction. Therefore, the engaging portion 72 is restricted in movement in the up-down direction.

As shown in FIGS. 4A to 4C, the columnar member accommodating portion 51 is a portion that guides (moves)

the engaged portion 61 of the columnar member 6 in the up-down direction. The opening 5A is formed in the lower side surface 5a of the case member 5 facing the columnar member accommodating portion 51. The base portion 62 of the columnar member 6 moves in the up-down direction via the opening 5A. The diameter of the opening 5A is formed to be smaller than the diameter of the engaged portion 61 and larger than the diameter of the base portion 62. Thus, only the base portion 62 is exposed from the opening 5A, and the engaged portion 61 moves in the inside of the columnar member accommodating portion 51.

The switching member accommodating portion 52 is a portion that guides (moves) the switching member 8 in an oblique direction. In the switching member accommodating portion 52, a first rib 521 extending from top to bottom in a rib shape from a right side surface 5b of the case member 5 that serves as a boundary between the columnar member accommodating portion 51 and the switching member accommodating portion 52 is formed. For the first rib 521, first guide portions 522 extending along the right side surface 5b from the first rib 521 to the front side are formed.

The first guide portion 522 is a portion that guides the first sliding portion 85 of the switching member 8. The first guide portion 522 includes an inner R surface and an outer R surface and is configured to be smoothly connected. The first sliding portion 85 slides on the inner R surface and the outer R surface of the first guide portion 522. Two first guide portions 522 are installed along the first rib 521.

Although not shown in the drawing, the first rib 521 is similarly formed also on a left side surface 5c of the case member 5 at a position facing the first rib 521 of the right side surface 5b. Moreover, the first guide portions 522 formed for the first rib 521 of the right side surface 5b are similarly installed also on the left side surface 5c in a facing manner.

In the switching member accommodating portion 52, second guide portions 523 that form a front side surface 5d of the case member 5 and that extend from the front side surface 5d along an inner surface of the right side surface 5b are formed. The second guide portion 523 is a portion that guides the second sliding portion 86 of the switching member 8. The second guide portion 523 includes an outer R surface and is configured to be smoothly connected. The second sliding portion 86 slides on the outer R surface of the second guide portion 523. Three second guide portions 523 are installed along the front side surface 5d. The second guide portions 523 are formed to be connected to the left side surface 5c. Thus, the front side surface 5d of the case member 5 is configured to include outer surfaces of the second guide portions 523.

As described above, the case member 5 includes two kinds of guide portions, the first guide portion 522 and the second guide portion 523, which guide the movement (movement in a second direction B to be described later) of the switching member 8.

Operation of Leg Portion

With reference to FIGS. 4A to 6C, the operation of the leg portion 3 will be described.

As shown in FIGS. 4A and 6A, when there is no pressing of the pressing portion 81 by the user, the spring member 9 presses the end portion 87 of the switching member 8, so that the switching member 8 moves in the down direction to cause the engaging portion 72 of the fixing member 7 to engage with the engaged portion 61 of the columnar member 6. Therefore, the operation of the columnar member 6 is restricted, and the columnar member 6 is brought into a fixed state.

Next, when the user presses the pressing portion 81 to move the switching member 8 in the up direction from the state of FIGS. 4A and 6A, the first sliding portion 85 of the switching member 8 comes in contact with the first guide portion 522 of the switching member accommodating portion 52 as shown in FIGS. 4B and 6B, and the first sliding portion 85 moves in the up direction along an outer shape of the first guide portion 522. At the same time, the second sliding portion 86 of the switching member 8 comes in contact with the second guide portion 523 of the switching member accommodating portion 52, and the second sliding portion 86 moves in the up direction along an outer shape of the second guide portion 523. When the user presses the pressing portion 81 to move the switching member 8, the user needs a pressing force against a pressing force of the spring member 9 on the switching member 8 (the end portion 87).

When the user presses the pressing portion 81 against the pressing force of the spring member 9, the first sliding portion 85 and the second sliding portion 86 are respectively guided by the first guide portion 522 and the second guide portion 523 and move, so that the switching member 8 moves in a direction away from the columnar member 6.

In the embodiment, although described later, the switching member 8 also moves in a direction toward the columnar member 6 opposite to the direction away therefrom. When the direction away from the columnar member 6 and the direction toward the columnar member 6 are collectively referred to as the "second direction B", it can be said that the fixing member 7 moves in the second direction B crossing the first direction A. In other words, the fixing member 7 held by the switching member 8 moves in the direction away from the columnar member 6 and reversely moves in the direction toward the columnar member 6. The direction in which the fixing member 7 moves away from the columnar member 6 and the direction in which the fixing member 7 moves toward the columnar member 6 can also be collectively referred to as the "second direction B".

With this operation, the switching member 8 moves in the second direction B along the first guide portion 522 and the second guide portion 523.

As shown in FIG. 6B, following the movement of the switching member 8 in the second direction B (the direction away from the columnar member 6), the fixing member 7 held by the switching member 8 is restricted in movement in the up direction and moves in the front direction because the length of the fixing member 7 in the up-down direction is equivalent to the length of the switching member accommodating portion 52 in the up-down direction. Specifically, the fixing member 7 moves in the front direction while sliding on the fixing member accommodating portion 83 and the holding projection 84.

The fixing member 7 moves in the front direction following the movement of the switching member 8 in the direction away from the columnar member 6, and thus, the engagement between the engaged portion 61 of the columnar member 6 and the engaging portion 72 of the fixing member 7 is brought into a state in which the engagement is released as shown in FIG. 6B. In other words, the fixing member 7 moves in the front direction and thus moves in the direction away from the columnar member 6 (the engaged portion 61), so that the engagement of the fixing member 7 with the columnar member 6 (the engaged portion 61) is brought into the released state.

As shown in FIG. 4C, when the pressing portion 81 is pressed, the pressing portion 81 comes in contact with the lower side surface 5a of the case member 5, so that the movement of the pressing portion 81 to the upper side (in the second direction B) is restricted in the embodiment. This state is a state in which a gap between the columnar member 6 (the engaged portion 61) and the fixing member 7 (the engaging portion 72) is most wide.

As described above, when the fixing member 7 releases the engagement with the columnar member 6 due to the movement of the switching member 8 away from the columnar member 6, the columnar member 6 is free in movement in the first direction A. In this state, an angle adjustment is performed.

When an installation angle is adjusted, for example the user stands on the back surface side of the projector 1, holds the right side surface of the external housing 2 with one hand, holds the front side surface with the other hand, and at the same time comes in contact with the pressing portion 81 from the down direction with any finger. Next, by pressing (pushing in the up direction) the pressing portion with the finger contacting the pressing portion 81, the user releases the engagement of the fixing member 7 with the columnar member 6. Then, the user performs an angle adjustment by moving up or down the front side surface of the external housing 2 with one hand and the other hand while maintaining (maintaining the pressing) a state in which the engagement is released. The projecting amount of the columnar member 6 from the bottom surface portion 21 changes following the moving up or down of the front side surface in a state in which the cap portion 63 of the columnar member 6 comes in contact with the placement surface because the engagement of the fixing member 7 with the columnar member 6 is released. Then, when a projected image is projected in a desired area, the user stops pressing. With this operation, the angle adjustment is completed.

As shown in FIGS. 4C and 6B, in the state in which the engagement of the fixing member 7 with the columnar member 6 is released, the second sliding portion 86 of the switching member 8 is located above the second guide portion 523 of the switching member accommodating portion 52. In this state, the spring member 9 is in a state of being pressed by the end portion 87 of the switching member 8.

FIG. 6C is a diagram for explaining a state after finishing the angle adjustment and stopping the pressing.

When the user stops the pressing while maintaining the angle (the projecting amount of the columnar member 6) because the angle adjustment is finished, the end portion 87 of the switching member 8 is pushed in the down direction by the pressing force of the spring member 9 and starts moving as shown in FIGS. 4C and 4B. When the end portion 87 starts moving, the second sliding portion 86 moves along the second guide portion 523. Moreover, the first sliding portion 85 moves along the first guide portion 522.

With this movement, the switching member 8 moves in the second direction B and thus moves toward the columnar member 6. In other words, the fixing member 7 held by the switching member 8 moves toward the columnar member 6. Then, as shown in FIG. 6C, the engaging portion 72 of the fixing member 7 engages with the engaged portion 61 of the columnar member 6. With this operation, the columnar member 6 can be fixed in a state in which the angle adjustment is made (with the adjusted projecting amount of the columnar member 6).

As described above, according to the projector 1 according to the embodiment, the following advantageous effects can be obtained.

(1) According to the embodiment, the leg portion 3 includes the columnar member 6, the case member 5, the fixing member 7, and the switching member 8. The switching member 8 moves in the second direction B crossing the first direction A inside the case member 5. The fixing member 7 is moved in the direction away from the columnar member 6, as the second direction B, to release the engagement with the columnar member 6, so that the movement of the columnar member 6 in the first direction A can be made possible. Moreover, the fixing member 7 is moved in the direction toward the columnar member 6, as the second direction B, to engage with the columnar member 6, so that the movement of the columnar member 6 in the first direction A can be restricted. With these operations, the leg portion 3 configured to perform the adjustment of an installation angle of the external housing 2 can be realized.

(2) According to the embodiment, the columnar member 6 includes the engaged portion 61 to be engaged with the engaging portion 72 of the fixing member 7 in the columnar member accommodating portion 51 of the case member 5, and the base portion 62 moving in the first direction A outside the case member 5. With this configuration, there is no need, outside the case member 5, to provide the engaged portion 61 for the base portion 62 moving in the first direction A, which eliminates the need to expose an engaging region as an external appearance. Thus, an external appearance of the base portion 62 to be exposed can be a simple external appearance, and the impairment of an aesthetic appearance can be suppressed.

(3) According to the embodiment, the case member 5 includes the first guide portion 522 and the second guide portion 523 guiding the movement of the switching member 8 in the second direction B, and thus, the switching member 8 can be smoothly and reliably moved.

(4) According to the embodiment, the switching member 8 includes the holding projection 84 holding the fixing member 7, and thus, the fixing member 7 can be reliably moved following the movement of the switching member 8 in the second direction B.

(5) According to the embodiment, the projector 1 includes the spring member 9 moving the switching member 8 in the direction in which the fixing member 7 engages with the columnar member 6. With this configuration, when the user stops pressing the pressing portion 81 of the switching member 8 after an angle adjustment, the fixing member 7 can be moved to reliably engage with the columnar member 6 by the pressing force of the spring member 9 on the switching member 8.

(6) According to the embodiment, the switching member 8 includes the pressing portion 81 as the tip portion extending from the bottom surface portion 21 of the external housing 2. The engagement of the fixing member 7 with the columnar member 6 is released by pressing and moving the pressing portion 81 in the second direction B. The engagement of the fixing member 7 with the columnar member 6 is performed by stopping the pressing. Thus, an angle adjustment can be easily performed.

(7) According to the embodiment, the engaged portion 61 of the columnar member 6 and the engaging portion 72 of the fixing member 7 are configured in a screw shape, and therefore, the engaging portion 72 can reliably engage with the engaged portion 61. Moreover, after an angle adjustment, a fine adjustment of the angle can also be performed by rotating the base portion 62 of the columnar member 6 in a state in which the engaging portion 72 engages with the engaged portion 61.

(8) According to the embodiment, the case member 5 accommodates the engaged portion 61 of the columnar member 6, the fixing member 7, the switching member 8

(the switching portion main body 82) other than the tip portion (the pressing portion 81), and the spring member 9 so as to hermetically seal the engaged portion 61 of the columnar member 6, the fixing member 7, the switching member 8 (the switching portion main body 82) other than the tip portion (the pressing portion 81), and the spring member 9 in the inside of the case member 5, and the base portion 62 of the columnar member 6 is movable to the outside of the case member 5. With this configuration, even when an angle adjustment is repeated in a case in which dust adheres to the base portion 62 exposed, the adhering dust remains in the inside of the case member 5 and thus can be prevented from entering the inside of the external housing 2 in which the optical component portion, the circuit component portion, and the like are accommodated. Therefore, a trouble such as the reflection of dust in a projection image can be prevented.

The present disclosure is not limited to the embodiment described above, and various modifications or improvements can be added to the embodiment described above. A modified example will be described below.

MODIFIED EXAMPLE 1

In the embodiment, the engaged portion 61 of the columnar member 6 and the engaging portion 72 of the fixing member 7 are configured in a screw shape. However, the engaged portion 61 and the engaging portion 72 are not limited to this shape and may be configured in a rack shape. By configuring the engaged portion 61 and the engaging portion 72 in a rack shape, the engaged portion 61 and the engaging portion 72 can be further reliably engaged with each other compared to those in a screw shape.

Contents derived from the embodiment will be described below.

A projector is a projector including a leg portion that is installed on a bottom surface of a housing and that adjusts an installation angle of the housing, wherein the leg portion includes a columnar member movably installed in a first direction crossing the bottom surface, a case member in which the columnar member is accommodated, a fixing member that includes an engaging portion along the first direction inside the case member and that fixes the columnar member, and a switching member that is movably installed in a second direction crossing the first direction and that switches the fixing member between a state in which the fixing member moves in a direction toward the columnar member, in the second direction inside the case member, to thereby engage with the columnar member and a state in which the fixing member moves in a direction away from the columnar member to thereby release engagement with the columnar member.

According to this configuration, the leg portion includes the columnar member, the case member, the fixing member, and the switching member. The switching member moves in the second direction crossing the first direction inside the case member. The fixing member is moved in the direction away from the columnar member, as the second direction, to release the engagement with the columnar member, so that the movement of the columnar member in the first direction can be made possible. Moreover, the fixing member is moved in the direction toward the columnar member, as the second direction, to engage with the columnar member, so that the movement of the columnar member in the first direction can be restricted. With these operations, the leg portion configured to perform the adjustment of an installation angle of the projector including the housing can be realized.

In the projector, the columnar member may include an engaged portion to be engaged with the engaging portion of the fixing member inside the case member, and a base portion moving in the first direction outside the case member.

According to this configuration, there is no need, outside the case member, to provide the engaged portion for the base portion moving in the first direction, which eliminates the need to expose an engaging region as an external appearance. Thus, an external appearance of the base portion to be exposed can be a simple external appearance, and the impairment of an aesthetic appearance can be suppressed.

In the projector, the case member may include a guide portion guiding movement of the switching member in the second direction.

According to this configuration, the switching member can be smoothly and reliably moved.

In the projector, the switching member may include a holding portion holding the fixing member.

According to this configuration, the fixing member can be reliably moved following the movement of the switching member in the second direction.

The projector may include a spring member moving the switching member in a direction in which the fixing member engages with the columnar member.

According to this configuration, after an angle adjustment, the fixing member can be moved to reliably engage with the columnar member by moving the switching member with the biasing force (pressing force) of the spring member on the switching member.

In the projector, the switching member may include a tip portion extending from the bottom surface, engagement of the fixing member with the columnar member may be released by pressing and moving the tip portion in the second direction, and engagement of the fixing member with the columnar member may be performed by stopping the pressing.

According to this configuration, the engagement of the fixing member with the columnar member is released by pressing the tip portion, and the engagement of the fixing member with the columnar member is performed by stopping the pressing. Thus, an angle adjustment can be easily performed.

In the projector, a shape of the engaging portion and the engaged portion may be a screw shape or a rack shape.

According to this configuration, when the engaging portion and the engaged portion are configured in a screw shape, the engaging portion can reliably engage with the engaged portion. Moreover, after an angle adjustment, a fine adjustment of the angle can also be performed by rotating the base portion of the columnar member in a state in which the engaging portion engages with the engaged portion. When the engaging portion and the engaged portion are configured in a rack shape, the engaging portion and the engaged portion can be further reliably engaged with each other compared to those in a screw shape.

In the projector, the case member may accommodate the engaged portion of the columnar member, the fixing member, the switching member other than the tip portion, and the spring member so as to hermetically seal the engaged portion of the columnar member, the fixing member, the switching member other than the tip portion, and the spring member in the inside of the case member, and the base portion of the columnar member may be movable to the outside of the case member.

According to this configuration, even when an angle adjustment is repeated in a case in which dust adheres to the base portion exposed, the adhering dust remains in the inside of the case member and thus can be prevented from entering the inside of the housing in which an optical component portion, a circuit component portion, and the like are accommodated. Therefore, a trouble such as the reflection of dust in a projection image can be prevented.

The entire disclosure of Japanese Patent Application No. 2018-079633 filed on Apr. 18, 2018 is expressly incorporated by reference herein.

What is claimed is:

1. A projector comprising a leg portion that is installed on a bottom surface of a housing and that adjusts an installation angle of the housing, wherein
   the leg portion includes
      a columnar member movably installed in a first direction crossing the bottom surface,
      a case member in which the columnar member is accommodated,
      a fixing member that includes an engaging portion along the first direction inside the case member and that fixes the columnar member, and
      a switching member that is movably installed in a second direction crossing the first direction and that switches the fixing member between a state in which the fixing member moves in a direction toward the columnar member, in the second direction inside the case member, to thereby engage with the columnar member and a state in which the fixing member moves in a direction away from the columnar member to thereby release engagement with the columnar member.

2. The projector according to claim 1, wherein the columnar member includes
      an engaged portion to be engaged with the engaging portion of the fixing member inside the case member and
      a base portion moving in the first direction outside the case member.

3. The projector according to claim 1, wherein
   the case member includes a guide portion guiding movement of the switching member in the second direction.

4. The projector according to claim 1, wherein
   the switching member includes a holding portion holding the fixing member.

5. The projector according to claim 1, further comprising a spring member moving the switching member in a direction in which the fixing member engages with the columnar member.

6. The projector according to claim 5, wherein
   the switching member includes a tip portion extending from the bottom surface,
   engagement of the fixing member with the columnar member is released by pressing and moving the tip portion in the second direction, and
   engagement of the fixing member with the columnar member is performed by stopping the pressing.

7. The projector according to claim 2, wherein
   a shape of the engaging portion and the engaged portion is a screw shape or a rack shape.

8. The projector according to claim 6, wherein
   the case member accommodates the engaged portion of the columnar member, the fixing member, the switching member other than the tip portion, and the spring member so as to hermetically seal the engaged portion of the columnar member, the fixing member, the switching member other than the tip portion, and the spring member in the inside of the case member, and
   the base portion of the columnar member is movable to the outside of the case member.

* * * * *